United States Patent
Saito et al.

(10) Patent No.: US 9,732,263 B2
(45) Date of Patent: Aug. 15, 2017

(54) WORKING FLUID COMPOSITION FOR REFRIGERATING MACHINE

(71) Applicant: JX NIPPON OIL & ENERGY CORPORATION, Tokyo (JP)

(72) Inventors: Masanori Saito, Tokyo (JP); Souichirou Konno, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/413,507

(22) PCT Filed: Jul. 11, 2013

(86) PCT No.: PCT/JP2013/069026
§ 371 (c)(1),
(2) Date: Jan. 8, 2015

(87) PCT Pub. No.: WO2014/010693
PCT Pub. Date: Jan. 16, 2014

(65) Prior Publication Data
US 2015/0203732 A1    Jul. 23, 2015

(30) Foreign Application Priority Data
Jul. 13, 2012  (JP) .................... 2012-157870

(51) Int. Cl.
C09K 5/04    (2006.01)
C10M 171/00    (2006.01)

(52) U.S. Cl.
CPC ......... *C09K 5/045* (2013.01); *C10M 171/008* (2013.01); *C09K 2205/106* (2013.01); *C09K 2205/12* (2013.01); *C09K 2205/24* (2013.01); *C10M 2205/0285* (2013.01); *C10M 2205/223* (2013.01); *C10N 2220/022* (2013.01); *C10N 2220/302* (2013.01); *C10N 2220/303* (2013.01); *C10N 2220/306* (2013.01); *C10N 2230/64* (2013.01); *C10N 2230/70* (2013.01); *C10N 2240/30* (2013.01)

(58) Field of Classification Search
CPC .............. C09K 5/045; C09K 2205/106; C09K 2205/122; C09K 2205/24; C10M 171/02; C10M 2205/173
See application file for complete search history.

(56) References Cited

U.S. PATENT DOCUMENTS

| 4,941,986 A | 7/1990 | Jolly | |
|---|---|---|---|
| 5,417,872 A * | 5/1995 | Fukuda | C09K 5/045 508/284 |
| 7,176,169 B2 | 2/2007 | Gibb et al. | |
| 2004/0063590 A1 | 4/2004 | Gibb et al. | |
| 2007/0155635 A1 | 7/2007 | Tagawa et al. | |
| 2010/0029524 A1 | 2/2010 | Fujinami et al. | |
| 2010/0282999 A1 | 11/2010 | Shimomura et al. | |
| 2011/0162410 A1 | 7/2011 | Low | |
| 2011/0191268 A1 | 8/2011 | Low | |
| 2011/0258146 A1 | 10/2011 | Low | |
| 2011/0258147 A1 | 10/2011 | Low | |
| 2011/0260095 A1 | 10/2011 | Low | |
| 2012/0024007 A1 | 2/2012 | Ota et al. | |
| 2014/0209830 A1 | 7/2014 | Shimomura et al. | |

FOREIGN PATENT DOCUMENTS

| CN | 1494583 | 5/2004 |
|---|---|---|
| CN | 101665681 | 3/2010 |
| CN | 101827921 | 9/2010 |
| CN | 102239228 | 11/2011 |
| CN | 102408936 | 4/2012 |
| EP | 1 231 255 | 8/2002 |
| EP | 2 149 592 | 2/2010 |
| EP | 2 527 420 | 11/2012 |
| JP | H1-161089 A | 6/1989 |
| JP | 08-226717 | 9/1996 |
| JP | 08-231972 | 9/1996 |
| JP | 10-265771 | 10/1998 |
| JP | 2000-044937 | 2/2000 |
| JP | 2000-274360 | 10/2000 |
| JP | 2006-275013 | 10/2006 |
| JP | 2008-106147 | 5/2008 |
| JP | 2010-031728 | 2/2010 |
| JP | 2010-065142 | 3/2010 |

(Continued)

OTHER PUBLICATIONS

Michels et al., Fuels and Lubricants Handbook—Technology, Properties, Performance, and Testing: (MNL 37WCD). ASTM International, (2003) pp. 413-421.*
Extended European Search Report for EP Patent Application No. 13816283.9, which was mailed on Mar. 20, 2015.
Office Action issued in China Counterpart Patent Appl. No. 201380032749.8, dated Aug. 13, 2015.
Office Action issued in Japan Counterpart Patent Appl. No. 2012-157870, dated Nov. 2, 2015.
Office Action issued in China Counterpart Patent Appl. No. 201380032749.8, dated Jan. 28, 2016.
International Preliminary Report on Patentability for PCT/JP2013/069026, which was mailed on Jan. 22, 2015.
International Search Report for PCT/JP2013/069026, which was mailed on Oct. 8, 2013.
Office Action issued in Japan Counterpart Patent Appl. No. 2012-157870, dated Nov. 10, 2015.

(Continued)

*Primary Examiner* — John Hardee
(74) *Attorney, Agent, or Firm* — Greenblum & Bernstein, P.L.C.

(57) ABSTRACT

A working fluid composition for a refrigerating machine comprises a refrigerant comprising monofluoroethane and a refrigerating machine oil comprising, as a base oil, at least one selected from a mineral oil having % $C_N$ in an n-d-M ring analysis of 10 to 60 and a pour point of −15° C. or lower and a synthetic hydrocarbon oil having a pour point of −15° C. or lower, and the refrigerating machine oil having a kinematic viscosity at 40° C. of 3 to 500 mm$^2$/s.

4 Claims, No Drawings

(56) References Cited

FOREIGN PATENT DOCUMENTS

| JP | 2010-261052 | 11/2010 |
| JP | 2011-162766 | 8/2011 |
| JP | 2012-031239 | 2/2012 |
| JP | 2012-510550 | 5/2012 |
| WO | 02/070637 | 9/2002 |
| WO | 2004/037913 | 5/2004 |
| WO | 2005/105947 | 11/2005 |
| WO | 2009/057475 | 5/2009 |
| WO | 2014/010693 A1 | 1/2014 |

OTHER PUBLICATIONS

Office Action issued in Japan Counterpart Patent App. No. 2016-096001, dated Dec. 13, 2016.
European Office Action in respect to European Application No. 13816283.9, dated Apr. 6, 2017.
A.S. Padalker et al., "Prospective of HFC-161 as an alternative to HCFC-22 in air conditioners", 23rd IIR International Congress Of Refrigeration, Aug. 2011, p. 364, XP055360309.

\* cited by examiner

WORKING FLUID COMPOSITION FOR REFRIGERATING MACHINE

TECHNICAL FIELD

The present invention relates to a working fluid composition for a refrigerating machine, and more specifically relates to a working fluid composition for a refrigerating machine that contains a refrigerant which contains monofluoroethane (also referred to as "HFC-161" or "R161").

BACKGROUND ART

CFC (chlorofluorocarbon) and HCFC (hydrochlorofluorocarbon), which have been conventionally used as refrigerants for refrigeration equipment, have been subject to regulation due to the problem of recent ozone depletion, and HFC (hydrofluorocarbon) has come to be used as a refrigerant instead of them.

Among HFC refrigerants, HFC-134a, R407C, and R410A are normally used as refrigerants for car air-conditioners, coolerators, or room air-conditioner. Although the ozone depletion potential (ODP) of these HFC refrigerant is zero, these come to be subject to regulation, because the global warming potential (GWP) thereof is high. While difluoromethane has been studied as one of alternate candidates of these refrigerants, difluoromethane has the following problems: the global warming potential thereof is not sufficiently low; the boiling point thereof is so low that thermodynamic characteristics cannot be applied to a current refrigeration system directly; and difluoromethane is not easily compatible with lubricating oils (refrigerating machine oils) used for conventional HFC refrigerants, such as polyol esters and polyvinyl ethers. On the other hand, unsaturated hydrofluorocarbons have been proposed to be used as a refrigerant due to the following reasons; both of its ODP and GWP are very low; unsaturated hydrofluorocarbons are non-flammable depending on structures; and in particular with respect to HFO-1234yf, thermodynamic characteristics as measures of refrigerant performances are comparable with or better than those of HFC-134a (Patent Literatures 1 to 3).

In addition, a working medium consisting of 80% by mass or more of one or more first components selected from 1,1-difluoroethane (HFC-152a), 1,1,1-trifluoro-2-monofluoroethane (HEC-134a) and 1,1,1-trifluoro-2,2-difluoroethane (HFC-125) as first components, and 20% by mass or less of carbon dioxide (R744) as a second component has been proposed (Patent Literature 4).

Hydrocarbons such as isobutane (R600a) and propane (R290) that are flammable, in which the ODP is 0 and the GWP is as extremely low as about 3, have also been studied (Patent Literatures 5 to 7).

CITATION LIST

Patent Literature

[Patent Literature 1] International Publication WO2004/037913
[Patent Literature 2] International Publication WO2005/105947
[Patent Literature 3] International Publication WO2009/057475
[Patent Literature 4] Japanese Patent Application Laid-Open No. 10-265771
[Patent Literature 5] Japanese Patent Application Laid-Open No. 2000-044937
[Patent Literature 6] Japanese Patent Application Laid-Open No. 2000-274360
[Patent Literature 7] Japanese Patent Application Laid-Open No. 2010-031728

SUMMARY OF INVENTION

Technical Problem

An object in a refrigeration/air-conditioning system is to find out a working fluid satisfying all of the following many characteristics: with respect to a refrigerant, adverse influences on the environment are small due to a low global warming potential (GWP), use with safety is possible because burning and explosion hardly occur, thermodynamics characteristics are suitable for applications, and large-scale supply is possible because the chemical structure is simple; and with respect to characteristics in the system where a refrigerant and a refrigerating machine oil coexist, they are soluble in each other (compatibility) and are excellent in stability, and an oil film that is not worn is maintained (lubricity).

As the next-generation low-GWP refrigerant instead of the current high-GWP HFC refrigerant, HFC-32 (GWP: 675), HFO-1234yf (GWP: 4), HFC-152a (GWP: 120), and propane (R290, GWP: 3) are studied as major candidates, as described above, but each of them is problematic.

In the refrigerant circulation cycle of refrigeration/air-conditioning equipment, since a refrigerating machine oil for lubricating a refrigerant compressor circulates together with a refrigerant in the cycle, the refrigerating machine oil is demanded to be compatible with the refrigerant. In the refrigeration/air-conditioning system using HFC-32, however, a problem is that HFC-32 is hardly compatible with the refrigerating machine oil. In the refrigeration/air-conditioning equipment, sufficient compatibility between the refrigerant and the refrigerating machine oil is not achieved depending on the selection of the refrigerating machine oil used with the refrigerant, and the refrigerating machine oil discharged from the refrigerant compressor easily remains at a place where the temperature is low in the cycle. As a result, there occur the problems of wear due to lubrication failure by the reduction in amount of the oil in the refrigerant compressor and of blockage of an expansion mechanism such as a capillary that is a narrow tube whose inner diameter is 1 mm or less. In addition, there is also the following problems about thermodynamics characteristics: because the boiling point of HFC-32 is −52° C. and is lower than that of the current refrigerant, HCFC-22, used for room air-conditioners, all-in-one air conditioners, and the like by about 10° C., the pressure is higher at the same temperature and thus the discharge temperature is excessively increased; and furthermore, the GWP thereof is 675 and thus is not sufficiently low.

In the refrigeration/air-conditioning system using HFO-1234yf being an unsaturated hydrofluorocarbon, whose GWP is also extremely low, it has been considered that HFO-1234yf is compatible with the refrigerating machine oil such as polyol esters and an ether compound used for the current HFC, and thus is applicable. According to the studies by the present inventors, however, the following problem about stability has been revealed: unsaturated hydrofluorocarbons have unstable double bonds in their molecules and thus are poor in thermal/chemical stability. In addition, HFO-1234yf, whose boiling point is −25° C., can be applied in the fields of a car air-conditioner and a coolerator in which HFC-134a whose boiling point is −26° C. is used, but cannot be applied in the fields of a room air-conditioner, an all-in-one air conditioner, an industrial refrigerating machine, and the like in which HCFC-22 whose boiling point is −41° C. and whose pressure is relatively high is used and the amount of the refrigerant used is large, because efficiency is too low.

HFC-152a, whose GWP is also low, is a well-balanced refrigerant in terms of characteristics, but is flammable. HFC-152a, whose boiling point is −25° C., however, can be applied only in the field of HFC-134a due to thermodynamics characteristics thereof. In the coolerator field, in which the amount of the refrigerant charged is small, among main fields in which HFC-134a is used, switching to isobutane (R600a) whose GWP is as low as 3 has already progressed. Isobutane, however, also has the problem of incapable of being applied to applications in which the amount of the refrigerant charged is small, in terms of thermodynamics characteristics and safety.

Propane, whose boiling point is −42° C. and whose GWP is also extremely low, is excellent in refrigerant characteristics in the field in which HCFC-22, or as an alternate thereof, R410A that is a mixed refrigerant where the ODP is 0 and HFC-32 and HFC-125 are each present in 50% by mass is used. Propane, however, is highly flammable and also high in explosibility, and has the problem of safety.

In the case of the refrigerant as described in Patent Literature 4, consisting of 80% by mass or more of 1,1-difluoroethane and the like as first component(s) and 20% by mass or less of carbon dioxide as a second component, the ODP is 0, but the GWP is not sufficiently low.

The present invention has been made under such circumstances, and an object thereof is to provide a working fluid composition for a refrigerating machine that has little adverse influences on the environment and that can achieve compatibility, thermal/chemical stability and lubricity in a highly effective system at high levels.

Solution to Problem

The present inventors have made intensive studies in order to achieve the above object, and as a result, have found that, by using a refrigerant containing monofluoroethane (HFC-161), and a refrigerating machine oil containing a specific mineral oil and/or synthetic hydrocarbon oil as a base oil in combination, both of refrigerant compatibility and thermal/chemical stability can be achieved at high levels, leading to the completion of the present invention.

That is, the present invention provides a working fluid composition for a refrigerating machine comprising:
a refrigerant comprising monofluoroethane; and
a refrigerating machine oil comprising, as a base oil, at least one selected from a mineral oil having % $C_N$ in an n-d-M ring analysis of 10 to 60 and a pour point of −15° C. or lower and a synthetic hydrocarbon oil having a pour point of −15° C. or lower, and the refrigerating machine oil having a kinematic viscosity at 40° C. of 3 to 500 mm$^2$/s.

It is preferable that a mass ratio of the refrigerant to the refrigerating machine oil be 90:10 to 30:70.

It is preferable that a proportion of the monofluoroethane in the refrigerant be 50% by mass or more, and, in addition, it is preferable that a global warming potential of the refrigerant be 300 or less.

It is preferable that the refrigerant further comprises carbon dioxide.

In the case where the base oil comprises the synthetic hydrocarbon oil, it is preferable that the synthetic hydrocarbon oil be at least one selected from an alkylbenzene, an alkylnaphthalene and a poly-α-olefin.

Advantageous Effects of Invention

According to the present invention, it is possible to provide a working fluid composition for a refrigerating machine/air-conditioner, which can achieve compatibility, thermal/chemical stability and lubricity at high levels in a refrigeration/air-conditioning system, in which a refrigerant containing monofluoroethane is used, with no need for significant modifications of an existing system.

In addition, according to the working fluid composition for a refrigerating machine of the present invention, it is possible to achieve the reduction in GWP of the refrigerant and non-flammability thereof, and to operate a refrigeration/air-conditioning system in a safe and highly-efficient manner.

DESCRIPTION OF EMBODIMENTS

Hereinafter, a suitable embodiment of the present invention is described in detail.

A working fluid composition for a refrigerating machine according to an embodiment of the present invention contains:
a refrigerant containing monofluoroethane; and
a refrigerating machine oil containing, as a base oil, at least one selected from a mineral oil having % $C_N$ in an n-d-M ring analysis of 10 to 60 and the pour point of −15° C. or lower and a synthetic hydrocarbon oil having the pour point of −15° C. or lower, and having the kinematic viscosity at 40° C. of 3 to 500 mm$^2$/s.

In the working fluid composition for a refrigerating machine according to the present embodiment, the proportions of the refrigerant and the refrigerating machine oil blended are not particularly limited, but the mass ratio of the refrigerant to the refrigerating machine oil is preferably 90:10 to 30:70 and more preferably 80:20 to 40:60.

Then, the components contained in the working fluid composition for a refrigerating machine are described in detail.

[Refrigerant]

The refrigerant in the present embodiment contains monofluoroethane (HFC-161). Monofluoroethanes have one fluorine atom in their molecules and exhibit characteristic properties.

That is, first, in the field in which HCFC-22 has been used as the refrigerant, propane (R290) is most suitable as a low-GWP refrigerant because of thermodynamics characteristics. Propane, however, is highly flammable, and thus has the large problem of safety and the following problem: in the case of existing with the refrigerating machine oil, it is so dissolved in the refrigerating machine oil that the viscosity of the oil is significantly reduced, causing lubricity to be deteriorated.

On the contrary, monofluoroethanes have a low GWP, specifically 100 or less, and a boiling point of −37° C. which is close to the boiling point of HCFC-22, −41° C. Thus, its thermodynamics characteristics are similar to those of HCFC-22, and it is good in thermodynamics characteristics as the refrigerant, compatibility with the refrigerating machine oil, and stability, even by itself. Although being flammable, HFC-161 has an explosion lower limit of 5.0% by volume while the explosion lower limit of propane is 2.1% by volume, and HFC-161 has a boiling point higher than that of propane by 5° C., and a lower pressure than propane, which hardly causes refrigerant leakage and results in much higher safety. The refrigerant concentration in a room rarely reaches 5.0% by volume. In addition, since monofluoroethanes have fluorine in their molecules, the amount thereof dissolved in the refrigerating machine oil is much smaller than that of propane, and therefore the amount of the refrigerant charged per refrigeration/air-conditioning apparatus is small. Thus, it is considered that practical realization is possible by taking corresponding safety measures. Since the amount dissolved in the coexisting refrigerating machine oil is small, the reduction in viscosity of the refrigerating machine oil is also small, resulting in an advantage in lubricity; and since no double bond is present in the molecules, stability is not problematic.

In addition, the refrigerant containing HFC-161 can further contain other refrigerant component to thereby make characteristics of a refrigerant (mixed refrigerant) more suitable depending on the purpose/application. Examples of the refrigerant blended include hydrofluorocarbons (HFCs), hydrofluoroolefins (HFOs), carbon dioxide (R744), ammonia (R717), and a fluorinated ether compound.

Here, with respect to HFCs and HFOs among the above refrigerant components, as the number of fluorine atoms in the molecule is larger, namely, as the proportion of fluorine atoms in one molecule is higher, compatibility with the mineral oil and the synthetic hydrocarbon oil is deteriorated. Accordingly, depending on the proportion blended with HFC-161, in the case where the refrigerant and the refrigerating machine oil are partially separated into two layers, a measure in a system is required.

Preferable components combined with the monofluoroethane include, with listed together with the boiling point, GWP and flammability noted in parentheses, HFC-32 (−52° C., 675, low flammable), HFC-152a (−25° C., 120, flammable), HFC-143a (−47° C., 4300, low flammable), HFC-134a (−26° C., 1300, non-flammable), HFC-125 (−49° C., 3400, non-flammable), HFO-1234ze (−19° C., 6, low flammable), HFO-1234yf (−29° C., 4, low flammable), propane (−42° C., 3, highly flammable), isobutane (−12° C., 3, highly flammable), and carbon dioxide (−78° C., 1, non-flammable). These components may be used in combination of two or more.

For example, in order to enhance the safety of the refrigerant (mixed refrigerant) in the present embodiment, a non-flammable refrigerant may be blended, but a non-flammable FTC refrigerant is generally high in GWP. Then, there is a method of blending a low flammable refrigerant for the balance of characteristics. In particular, since carbon dioxide is non-flammable and is the standard compound of GWP, whose GWP is as low as 1, blending thereof is effective as long as it has no influence on thermodynamics characteristics.

In addition, while a high-pressure refrigerant, namely, a low boiling point refrigerant is blended in order to enhance efficiency, propane is highly flammable, and thus HFC-32, HFC-143a, and HFC-125 are candidates.

For making the GWP low, HFO-1234ze, HFO-1234yf and carbon dioxide, and further propane and isobutane are preferable.

In addition, in the case where the pressure of the mixed refrigerant is decreased for applications to fields other than the field where HCFC-22 has been used, the refrigerant is selected from relatively low-pressure refrigerants such as HFC-134a, HFO-1234ze and HFO-1234yf whose boiling points are higher than −30° C., in consideration of the overall balance of characteristics.

In the case where the refrigerant in the present embodiment is a mixed refrigerant of the monofluoroethane and the above component, the proportion of the monofluoroethane in the mixed refrigerant is preferably 50% by mass or more and more preferably 70% by mass or more. In addition, the GWP is preferably 300 or less, more preferably 200 or less, and further preferably 150 or less from the viewpoint of the global environment protection. In the case where the refrigerant for use in the present embodiment is a mixed refrigerant, the mixed refrigerant is preferably an azeotropic mixture, but it is not particularly required to be an azeotropic mixture as long as it has physical properties necessary as the refrigerant.

[Refrigerating Machine Oil]

The refrigerating machine oil in the present embodiment contains, as a base oil, at least one selected from a mineral oil having % $C_N$ in an n-d-M ring analysis of 10 to 60 and the pour point of −15° C. or lower and a synthetic hydrocarbon oil having the pour point of −15° C. or lower.

The mineral oil can be obtained by refining a lubricating oil fraction obtained by distilling a crude oil such as a paraffinic or naphthenic crude oil at ordinary pressure or under reduced pressure, with one or an appropriate combination of two or more of solvent deasphalting, solvent refining, hydrorefining, hydrocracking, solvent dewaxing, hydrodewaxing, a clay treatment and sulfuric acid cleaning.

The n-d-M ring analysis is defined in ASTM D-3238, and is a method for measuring the refractive index and the density at 20° C., the sulfur content, and the viscosities (40° C. and 100° C.) of an oil to determine the number of aromatic carbon atoms (% $C_A$), the number of naphthenic carbon atoms (% $C_N$) and the number of paraffinic carbon atoms (% $C_P$) by calculation, and since the total of the three types of carbon atoms is 100%, the index of the composition type of the oil is provided. If the % $C_N$ of the mineral oil is less than 10, the % $C_P$ is larger and compatibility of the refrigerant with the oil is deteriorated. On the other hand, if the % $C_N$ of the mineral oil is more than 60, the % $C_P$ is smaller, resulting in the deterioration in viscosity characteristics, for example, the reduction in viscosity index, namely, the deterioration in lubricity. The % $C_N$ is preferably 20 to 50.

Examples of the synthetic hydrocarbon oil include alkylbenzenes, alkylnaphthalenes, poly-α-olefins (PAOs), polybutene and an ethylene-α-olefin copolymer, and the pour point is required to be −15° C. or lower because polybutene or the like is solid in the case of having a high molecular weight. In particular, alkylbenzenes, alkylnaphthalenes and PAOs are preferable in terms of characteristics such as compatibility and a viscosity index in the coexistence with a HFC-161 refrigerant.

Alkylbenzenes are aromatic hydrocarbons in which an alkyl group is bound to a benzene ring. Alkylbenzenes are classified to linear alkylbenzenes and branched alkylbenzene depending on the chemical structure of an alkyl group, and referred to as mono-, di-, tri-, or tetraalkylbenzenes depending on the number of substituted alkyl groups. As alkylbenzenes, those having 1 to 4 alkyl groups having 1 to 30 carbon atoms, in which the total number of carbon atoms in the alkyl group(s) is 3 to 30, are preferable. Alkyl groups include a methyl group, an ethyl group, and linear or branched propyl group, butyl group, pentyl group, hexyl group, heptyl group, octyl group, nonyl group, decyl group, undecyl group, dodecyl group, tridecyl group, tetradecyl group, heptadecyl group and octadecyl group, depending on the number of carbon atoms. In particular, a branched alkyl group derived from an oligomer of an olefin such as propylene, butene or isobutylene is preferable, and alkylbenzenes having the kinematic viscosity at 40° C. of 3 to 50 mm$^2$/s are more preferable.

Alkylnaphthalenes are aromatic hydrocarbons in which an alkyl group is bound to a naphthalene ring, and the alkyl group is the same as in alkylbenzenes. Alkylnaphthalenes in which a naphthalene ring has 1 to 4 alkyl groups having 1 to 10 carbon atoms and the total number of carbon atoms in the alkyl group(s) is 1 to 20 are preferable, and are excellent in stability such as heat resistance because the naphthalene ring is stable. In addition, alkylnaphthalenes having the kinematic viscosity at 40° C. of 10 to 100 mm$^2$/s are preferable.

Poly-α-olefins (PAOs) are colorless and transparent liquids that can be obtained by polymerizing only several molecules of linear olefins having 6 to 18 carbon atoms and having a double bond at one of both ends in a limited way, and then hydrogenating the resultant. Poly-α-olefins (PAOs) are, for example, isoparaffins in which a trimer or tetramer of α-decene having 10 carbon atoms or α-dodecene having 12 carbon atoms is distributed in the center and others are distributed in the vicinity of the center, and isoparaffins are high in purity and narrow in molecular weight distribution as compared with the mineral oil. Isoparaffins, whose molecular structures have comb-like branching, exhibit more excellent characteristics, such as a higher viscosity index, a lower pour point, and a higher flash point relative to viscosity, than the mineral oil.

The kinematic viscosity of the refrigerating machine oil in the present embodiment is not particularly limited, but the kinematic viscosity at 40° C. can be preferably 3 to 500 mm$^2$/s, more preferably 5 to 400 mm$^2$/s. In addition, the kinematic viscosity at 100° C. can be preferably 1 to 50 mm$^2$/s and more preferably 2 to 30 mm$^2$/s.

The volume resistivity of the refrigerating machine oil in the present embodiment is not particularly limited, but it can be preferably $1.0 \times 10^{10}$ Ω·m or more, more preferably $1.0 \times 10^{11}$ Ω·m or more. In particular, in the case where the refrigerating machine oil is used for a closed type refrigerating machine, a high electrical insulation property tends to be required. In the present invention, the volume resistivity means the value at 25° C. measured according to JIS C 2101 "Electrical Insulation Oil Test Method".

The moisture content of the refrigerating machine oil in the present embodiment is not particularly limited, but it can be preferably 100 ppm or less, more preferably 50 ppm or less, and most preferably 30 ppm or less based on the total amount of the refrigerating machine oil. In particular, in the case where the refrigerating machine oil is used for a closed type refrigerating machine, the moisture content is demanded to be low from the viewpoint of the influence on thermal/chemical stability and the electrical insulation property of the refrigerating machine oil.

The acid value of the refrigerating machine oil in the present embodiment is not particularly limited, but it can be preferably 0.1 mgKOH/g or less and more preferably 0.05 mgKOH/g or less in order to prevent corrosion of a metal used for a refrigerating machine or a pipe, and to prevent degradation of the refrigerating machine oil. In the present invention, the acid value means the acid value measured according to JIS K2501 "Petroleum Products And Lubricating Oils-Neutralization Value Test Method".

The ash content of the refrigerating machine oil in the present embodiment is not particularly limited, but it can be preferably 100 ppm or less and more preferably 50 ppm or less in order to increase the thermal/chemical stability of the refrigerating machine oil and to suppress the occurrence of sludge or the like. In the present invention, the ash content means the value of the ash content measured according to JIS K2272 "Crude Oil/Petroleum Product Ash Content and Sulfated Ash Content Test Method".

The working fluid composition for a refrigerating machine according to the present embodiment can also be used in the form of being blended with various additives, if necessary. The content of the following additives is preferably 5% by mass or less and particularly preferably 2% by mass or less based on the total amount of the refrigerating machine oil composition.

In order to further improve the wear resistance and the load resistance of the working fluid composition for a refrigerating machine according to the present embodiment, it is possible to blend at least one phosphorus compound selected from the group consisting of phosphates, acidic phosphates, thiophosphates, amine salts of acidic phosphates, chlorinated phosphates, and phosphites. These phosphorus compounds are esters of phosphoric acid or phosphorous acid and an alkanol or a polyether type alcohol, or derivatives thereof.

In addition, the working fluid composition for a refrigerating machine according to the present embodiment can contain at least one epoxy compound selected from a phenylglycidylether type epoxy compound, an alkylglycidylether type epoxy compound, a glycidylester type epoxy compound, an allyloxysilane compound, an alkyloxysilane compound, an alicyclic epoxy compound, an epoxidated fatty acid monoester and an epoxidated vegetable oil in order to further improve the thermal/chemical stability thereof.

In addition, the working fluid composition for a refrigerating machine according to the present embodiment can if necessary contain conventionally known additives for a refrigerating machine oil in order to further enhance the performances thereof. Examples of such additives includes a phenol-based oxidation preventing agent such as di-tert.-butyl-p-cresol and bisphenol A, an amine-based oxidation preventing agent such as phenyl-α-naphthylamine and N,N-di(2-naphthyl)-p-phenylenediamine, a wear inhibitor such as zinc dithiophosphate, an extreme pressure agent such as chlorinated paraffins and a sulfur compound, an oilness agent such as fatty acids, a defoaming agent such as silicones, a metal deactivator such as benzotriazole, a viscosity index improver, a pour point depressant, and a detergent dispersant. These additives may be used singly or in combination of two or more.

The working fluid composition for a refrigerating machine according to the present embodiment is preferably used for a room air-conditioner and a coolerator having a closed type reciprocating or rotating compressor, or an open-type or closed type car air-conditioner. In addition, the working fluid composition for a refrigerating machine and the refrigerating machine oil according to the present embodiment are preferably used for a cooling apparatus or the like of a dehumidifier, a water heater, a refrigeration chamber, a refrigeration and cooling warehouse, a vending machine, a showcase, a chemical plant, or the like. Furthermore, the working fluid composition for a refrigerating machine and the refrigerating machine oil according to the present embodiment are also preferably used for one having a centrifugal compressor.

EXAMPLES

Hereinafter, the present invention is more specifically described based on Examples and Comparative Examples, but the present invention is not limited to the following Examples at all.

[Refrigerating Machine Oil]

First, 0.1% by mass of di-tert.-butyl-p-cresol (DBPC) as an oxidation preventing agent was added to each of base oils 1 to 4 shown below to prepare each of refrigerating machine oils 1 to 4. Various properties of refrigerating machine oils 1 to 4 are shown in Table 1.

[Base Oil]

Base oil 1: base oil obtained by refining reduced pressure distillation oil from naphthenic crude oil, with furfural extraction and hydrorefining (produced by JX Nippon Oil & Energy Corporation)

Base oil 2: base oil obtained by refining reduced pressure distillation oil from paraffinic crude oil, with hydrocracking and hydrodewaxing (produced by SK Lubricants, Korea)

Base oil 3: branched alkylbenzene (produced by JX Nippon Oil & Energy Corporation)

Base oil 4: Poly-α-olefin (produced by Exxon Mobil Corporation)

TABLE 1

|  | Refrigerating machine oil 1 | Refrigerating machine oil 2 | Refrigerating machine oil 3 | Refrigerating machine oil 4 |
|---|---|---|---|---|
| Base oil | Base oil 1 | Base oil 2 | Base oil 3 | Base oil 4 |
| Pour point [° C.] | −30 | −45 | −50 | −65 |
| Kinematic viscosity at 40° C. [mm$^2$/s] | 105 | 7.3 | 15.8 | 30.9 |
| Kinematic viscosity at 100° C. [mm$^2$/s] | 7.7 | 2.2 | 3.1 | 5.9 |
| Viscosity index | 46 | 106 | 16 | 138 |
| Volume resistivity [Ω · m] | 3 × 10$^{12}$ | 2 × 10$^{12}$ | 9 × 10$^{11}$ | 4 × 10$^{12}$ |
| Acid value [mgKOH/g] | 0.01 | 0.01 | 0.01 | 0.01 |
| n-d-M ring analysis % CN | 43.9 | 22.5 | — | — |
| Ash content [ppm] | 0.1 | 0.1 | 0.1 | 0.1 |

Examples 1 to 8 and Comparative Examples 1 to 10

In each of Examples 1 to 0.8 and Comparative Examples 1 to 10, with respect to each working fluid composition for a refrigerating machine in which each of refrigerating machine oils 1 to 4 was combined with each refrigerant shown in Tables 2 to 4, evaluation tests shown below were performed. As described later, the mass ratio of the refrigerant to the refrigerating machine oil in the working fluid composition for a refrigerating machine was changed with respect to each test.

As the refrigerant, HFC-161 itself, or mixed refrigerant A, in which HFC-161 was blended with carbon dioxide (R744) and flammability was suppressed, was used in each of Examples. Herein, the value defined with respect to the GWP of HFC-161 was not released, and thus the maximum value, 100, was used for calculation.

In each of Comparative Examples, any of HFC-134a currently used widely, and propane (R290), HFC-32 and HFO-1234yf which were major candidates as new refrigerants in terms of GWP value, flammability, and thermodynamics characteristics was used.

[Refrigerant]
HFC-161: monofluoroethane (GWP: about 100)
R744: carbon dioxide (GWP: 1)
R290: propane (GWP: 3)
HFC-134a: 1,1,1,2-tetrafluoroethane (GWP: 1300)
HFC-32: difluoromethane (GWP: 675)
HFO-1234yf: 2,3,3,3-tetrafluoropropene (GWP: 4)
Mixed refrigerant A: HFC-161/R744=80/20 (mass ratio, GWP: about 80)

Then, with respect to each of the working fluid compositions for a refrigerating machine in Examples 1 to 8 and Comparative Examples 1 to 10, evaluation tests shown below were performed. The results are shown in Tables 2 to 4.

[Evaluation of Compatibility]

According to JIS-K-2211, "Test Method of Compatibility of Refrigerating Machine Oil with Refrigerant", 2 g of each refrigerating machine oil was blended with 18 g of each of the above refrigerants including the mixed refrigerants, and whether the refrigerant and the refrigerating machine oil were dissolved in each other at 0° C. or not was observed. The results obtained are shown in Tables 2 to 4. In Tables, "Compatible" means that the refrigerant and the refrigerating machine oil were dissolved in each other and "Separated" means that the refrigerant and the refrigerating machine oil were separated to two layers.

[Evaluation of Thermal/Chemical Stability]

According to JIS-K-2211, 1 g of a refrigerating machine oil (initial ASTM color L: 0.5) in which the moisture content was adjusted to 100 ppm or less, 1 g of each of various refrigerants described above, and a catalyst (wire of each of iron, copper and aluminum) were enclosed into a glass tube, and then the resultant was placed in a protective tube made of iron, and heated to 175° C. and kept therein for one week. After the test, the ASTM color of the refrigerating machine oil and the change in color of the catalyst color were evaluated. The ASTM color was evaluated according to ASTM D156. In addition, the change in color of the catalyst was evaluated by visually observing the appearance for rating as no change, no gloss, or blackened. In the case of no gloss or blackened, the mixed liquid of the refrigerating machine oil and the refrigerant, namely, a working fluid can be said to be deteriorated. The results obtained are shown in Tables 2 to 4.

TABLE 2

|  |  | Example 1 | Example 2 | Example 3 |
|---|---|---|---|---|
|  | Refrigerating machine oil | Refrigerating machine oil 1 | Refrigerating machine oil 2 | Refrigerating machine oil 3 |
|  | Refrigerant | HFC-161 | HFC-161 | HFC-161 |
|  | Compatibility | Compatible | Compatible | Compatible |
| Lubricity | Baking load, N | 2400 | 2000 | 1700 |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |
|  |  | Example 4 | Example 5 | Example 6 |
|  | Refrigerating machine oil | Refrigerating machine oil 4 | Refrigerating machine oil 1 | Refrigerating machine oil 2 |
|  | Refrigerant | HFC-161 | Mixed refrigerant A | Mixed refrigerant A |
|  | Compatibility | Compatible | Compatible | Compatible |
| Lubricity | Baking load, N | 1810 | 2470 | 1810 |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |

TABLE 3

|  |  | Example 7 | Example 8 | Comparative Example 1 |
|---|---|---|---|---|
|  | Refrigerating machine oil | Refrigerating machine oil 3 | Refrigerating machine oil 4 | Refrigerating machine oil 1 |
|  | Refrigerant | Mixed refrigerant A | Mixed refrigerant A | R290 |
|  | Compatibility | Compatible | Compatible | Compatible |
| Lubricity | Baking load, N | 1740 | 1830 | 650 or less |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |
|  |  | Comparative Example 2 | Comparative Example 3 | Comparative Example 4 |
|  | Refrigerating machine oil | Refrigerating machine oil 2 | Refrigerating machine oil 3 | Refrigerating machine oil 4 |
|  | Refrigerant | R290 | R290 | R290 |
|  | Compatibility | Compatible | Compatible | Compatible |
| Lubricity | Baking load, N | 650 or less | 650 or less | 650 or less |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |

TABLE 4

|  |  | Comparative Example 5 | Comparative Example 6 | Comparative Example 7 |
|---|---|---|---|---|
|  | Refrigerating machine oil | Refrigerating machine oil 1 | Refrigerating machine oil 3 | Refrigerating machine oil 2 |
|  | Refrigerant | HFC-134a | HFC-134a | HFC-32 |
|  | Compatibility | Separated | Separated | Separated |
| Lubricity | Baking load, N | 2400 | 1720 | 2020 |
| Thermal/chemical stability | ASTM color (ASTM D156) | L0.5 | L0.5 | L0.5 |
|  | Appearance of catalyst Cu | No change | No change | No change |
|  | Appearance of catalyst Fe | No change | No change | No change |
|  | Appearance of catalyst Al | No change | No change | No change |

TABLE 4-continued

|  | | Comparative Example 8 | Comparative Example 9 | Comparative Example 10 |
|---|---|---|---|---|
|  | Refrigerating machine oil | Refrigerating machine oil 4 | Refrigerating machine oil 1 | Refrigerating machine oil 3 |
|  | Refrigerant | HFC-32 | HFO-1234yf | HFO-1234yf |
|  | Compatibility | Separated | Separated | Separated |
| Lubricity | Baking load, N | 1810 | 2430 | 1730 |
| Thermal/ chemical stability | ASTM color (ASTM D156) | L0.5 | L1.0 | L2.0 |
|  | Appearance of catalyst Cu | No change | No gloss | No gloss |
|  | Appearance of catalyst Fe | No change | No gloss | No gloss |
|  | Appearance of catalyst Al | No change | No change | No change |

Each of Examples 1 to 8 of the present invention shown in Table 2 can be said to provide an excellent working fluid for a refrigerating machine/air-conditioner, in which the GWP of the refrigerant is as low as 150 or less, compatibility of the refrigerant with the refrigerating machine oil is not problematic, and thermal/chemical stability and lubricity are also good.

On the other hand, the working fluid in each of Comparative Examples 1 to 4 is difficult to use as a working fluid because, while each of the refrigerating machine oils is compatible with the refrigerant, the refrigerant is excessively dissolved to thereby cause the reduction in viscosity, resulting in the deterioration in lubricity. The working fluid in each of Comparative Examples 5 to 8 cannot be used because the GWP is high and no compatibility of the refrigerant with the refrigerating machine oil is exhibited. The working fluid in each of Comparative Examples 9 and 10 cannot be said to be a suitable working fluid because, while the GWP is low, thermal/chemical stability is poor in the coexistence of the refrigerating machine oil with the refrigerant, the copper and iron catalysts are discolored, coloration, namely, degradation of the oil is observed, and no compatibility is exhibited.

INDUSTRIAL APPLICABILITY

The present invention provides a working fluid composition for use in a refrigerating machine/air-conditioner using a refrigerant containing HFC-161, and the composition can be used as a working fluid in a in a high-cooling efficiency refrigeration system having a compressor, a condenser, a throttle device, an evaporator, and the like among which the refrigerant is circulated, in particular, in a refrigerating machine/air-conditioner having a compressor such as a rotary-type, swing-type, scrolling-type, or reciprocating-type compressor, and can be suitably used in the fields of a room air-conditioner, an all-in-one air conditioner, an industrial refrigerating machine, a coolerator, a car air-conditioner, and the like.

The invention claimed is:

1. A working fluid composition for a refrigerating machine comprising:
    a refrigerant comprising monofluoroethane; and
    a refrigerating machine oil comprising, as a base oil, at least one selected from a mineral oil having % $C_N$ in an n-d-M ring analysis of 10 to 60 and a pour point of −15° C. or lower and a synthetic hydrocarbon oil having a pour point of −15° C. or lower, and the refrigerating machine oil having a kinematic viscosity at 40° C. of 3 to 500 mm$^2$/s.

2. The working fluid composition for a refrigerating machine according to claim 1, wherein a mass ratio of the refrigerant to the refrigerating machine oil is 90:10 to 30:70.

3. The working fluid composition for a refrigerating machine according to claim 1, wherein a proportion of the monofluoroethane in the refrigerant is 50% by mass or more, and a global warming potential of the refrigerant is 300 or less.

4. The working fluid composition for a refrigerating machine according to claim 1, wherein the refrigerant further comprises carbon dioxide.

* * * * *